(12) United States Patent
Lee

(10) Patent No.: US 12,479,414 B2
(45) Date of Patent: Nov. 25, 2025

(54) HYBRID ELECTRIC VEHICLE AND METHOD OF CONTROLLING SAME

(71) Applicants: Hyundai Motor Company, Seoul (KR); Kia Corporation, Seoul (KR)

(72) Inventor: Ho Joong Lee, Anyang-si (KR)

(73) Assignees: Hyundai Motor Company, South (KR); Kia Corporation, Seoul (KR)

( * ) Notice: Subject to any disclaimer, the term of this patent is extended or adjusted under 35 U.S.C. 154(b) by 283 days.

(21) Appl. No.: 18/158,087

(22) Filed: Jan. 23, 2023

(65) Prior Publication Data

US 2024/0051516 A1    Feb. 15, 2024

(30) Foreign Application Priority Data

Aug. 11, 2022  (KR) .................. 10-2022-0100723

(51) Int. Cl.
*B60W 20/13* (2016.01)
*B60W 10/06* (2006.01)
*B60W 10/26* (2006.01)

(52) U.S. Cl.
CPC ............ *B60W 20/13* (2016.01); *B60W 10/06* (2013.01); *B60W 10/26* (2013.01);
(Continued)

(58) Field of Classification Search
CPC ...... B60W 20/13; B60W 10/06; B60W 10/26; B60W 2510/0623; B60W 2510/244; B60W 2710/244; B60W 2530/209; B60W 10/08; B60W 20/40; B60W 20/10; B60W 20/14; B60W 2510/06; B60W 2510/08; B60W 2510/242; B60W 2710/06; B60W 2710/08; B60W 2710/242; B60K 6/442; B60K 6/46; B60K 6/48; B60K 6/485; B60Y 2200/92;
(Continued)

(56) References Cited

U.S. PATENT DOCUMENTS

2007/0227792 A1* 10/2007 Yonemori ............. B60W 10/06
                                                                 903/902
2011/0172867 A1*  7/2011 Yu ......................... B60L 50/16
                                                                 903/903
(Continued)

FOREIGN PATENT DOCUMENTS

CN     106103227 A  * 11/2016  ............. B60H 1/004
CN     107444397 A  * 12/2017  ............... B60K 6/48
(Continued)

*Primary Examiner* — Mary Cheung
(74) *Attorney, Agent, or Firm* — Slater Matsil, LLP

(57) ABSTRACT

An embodiment hybrid electric vehicle includes a battery, a bidirectional power conversion device connected to the battery, a battery control unit configured to output a charge power instruction when a state of charge (SOC) of the battery is a first reference value or less by determining the SOC of the battery in a battery power output mode in which power of the battery is output to the outside through the bidirectional power conversion device, an engine control unit configured to drive an engine when the SOC of the battery is the first reference value or less, and a motor control unit configured to, when the charge power instruction is received, drive a motor such that the motor generates electricity using power from the engine and the battery is charged based on the received charge power instruction.

16 Claims, 2 Drawing Sheets

(52) U.S. Cl.
CPC ............... *B60W 2510/0623* (2013.01); *B60W 2510/244* (2013.01); *B60W 2710/244* (2013.01)

(58) Field of Classification Search
CPC ..................... B60Y 2300/91; B60Y 2400/112; Y02T 10/62
See application file for complete search history.

(56) References Cited

U.S. PATENT DOCUMENTS

| | | | | |
|---|---|---|---|---|
| 2012/0089290 | A1* | 4/2012 | Kato | B60L 3/0046 |
| | | | | 701/22 |
| 2014/0303820 | A1* | 10/2014 | Aoki | B60W 10/08 |
| | | | | 180/65.265 |
| 2017/0028978 | A1* | 2/2017 | Dunlap | B60W 10/26 |

FOREIGN PATENT DOCUMENTS

| | | | |
|---|---|---|---|
| CN | 214164723 U | * | 9/2021 |
| JP | 2009220765 A | * | 10/2009 |
| KR | 20210018695 A | | 2/2021 |

\* cited by examiner

HYBRID ELECTRIC VEHICLE AND METHOD OF CONTROLLING SAME

CROSS-REFERENCE TO RELATED APPLICATIONS

This application claims the benefit of Korean Patent Application No. 10-2022-0100723, filed on Aug. 11, 2022, which application is hereby incorporated herein by reference.

TECHNICAL FIELD

The present invention relates to a hybrid electric vehicle and a method of controlling the same.

BACKGROUND

Recently, eco-friendly vehicles equipped with an electric motor as a power source are increasing with an increase in interest in the environment. An eco-friendly vehicle is also called an electric vehicle, and a hybrid electric vehicle (HEV) and an electric vehicle (EV) are representative of eco-friendly vehicles.

Electric vehicles may be provided with a vehicle to load (V2L) function that is a function that can convert and output DC power of a battery into AC power. The V2L function is a function that can enable electronic devices to be used in various external environments and can enable the battery of another vehicle to be charged in an emergency because it can supply common power to the inside and outside of a vehicle. Since the capacity of the high-voltage battery that supplies power to an electric motor in electric vehicles is large, electric vehicles can use the V2L function for a long time.

However, since the capacity of the high-voltage battery of hybrid electric vehicles is generally smaller than that of electric vehicles, it is usually difficult for hybrid electric vehicles to use the V2L function for a long time, as compared with electric vehicles.

Accordingly, there is a need for a method of controlling the charge amount of a high-voltage battery so that hybrid electric vehicles can use an external load outside the hybrid electric vehicles for a long time even though the hybrid electric vehicles are given the V2L function.

The description provided above as a related art of embodiments of the present invention is just for helping understanding the background of embodiments of the present invention and should not be construed as being included in the related art known by those skilled in the art.

SUMMARY

The present invention relates to a hybrid electric vehicle and a method of controlling the same. Particular embodiments relate to a hybrid electric vehicle that can improve power efficiency by controlling a high-voltage battery charge amount of an inverter and a method of controlling the hybrid electric vehicle.

Embodiments of the present invention provide a hybrid electric vehicle that can improve a commercial value by increasing the duration of a V2L function using operation of an engine and operation of a motor in a regenerative braking period when the hybrid electric vehicle is provided with the V2L function and a method of controlling the hybrid electric vehicle.

The technical subjects to implement in embodiments of the present invention are not limited to the technical problems described above and other technical subjects that are not stated herein will be clearly understood by those skilled in the art from the following specifications.

A hybrid electric vehicle according to an embodiment of the present invention includes a battery, a bidirectional power conversion device connected to the battery, a battery control unit configured to output a charge power instruction when a state of charge (SOC) of the battery is a first reference value or less by determining the SOC of the battery in a battery power output mode in which power of the battery is output to the outside through the bidirectional power conversion device, an engine control unit configured to drive an engine when the SOC of the battery is the first reference value or less, and a motor control unit configured to, when the charge power instruction is received, drive a motor such that the motor generates electricity using power from the engine and the battery is charged, on the basis of the received charge power instruction.

For example, the battery control unit may calculate the charge power instruction on the basis of a load amount in the battery power output mode or a battery discharge amount in the battery power output mode.

For example, the battery control unit may calculate the charge power instruction on the basis of a larger one of the load amount in the battery power output mode and the battery discharge amount in the battery power output mode.

For example, the battery control unit may transmit battery power output mode operation state information and battery SOC information to the engine control unit and may transmit the charge power instruction to the motor control unit.

For example, the bidirectional power conversion device may include a bidirectional on-board charger (OBC) and the battery power output mode may be a mode in which power is supplied to external devices by converting DC voltage of the battery connected to a terminal of the bidirectional on-board charger into AC voltage and outputting the AC voltage through another terminal.

For example, the engine control unit may stop driving the engine when the engine is being driven due to the battery SOC and the battery SOC exceeds the first reference value.

For example, the engine control unit may determine a fuel remaining amount state for driving the engine when the engine is being driven due to the battery SOC and may stop driving the engine when a fuel remaining amount is a second reference value or less.

For example, the motor control unit may stop power generation by the motor when the battery is charged as much as the charge power instruction output from the battery control unit.

For example, the motor control unit may control the motor such that the battery is charged by a counter-electromotive force generated in the motor by power from the engine.

For example, the battery control unit may stop the battery power output mode when the battery SOC is a third reference value or less after the battery power output mode is entered.

A method of controlling a hybrid electric vehicle including a battery, a bidirectional power conversion device connected to the battery, and a battery control unit in accordance with an embodiment of the present invention includes driving an engine and outputting a charge power instruction when a state of charge (SOC) of the battery is a first reference value or less by determining the SOC of the battery in a battery power output mode in which power of the battery is output to the outside through the bidirectional power conversion device, and charging the battery by performing power generation through a motor using power from the engine on the basis of the received charge power instruction.

For example, the method may further include stopping driving the engine when the engine is being driven due to the battery SOC and the battery SOC exceeds the first reference value as the result of determining the SOC of the battery.

For example, the method may further include determining a fuel remaining amount state for driving the engine when the engine is being driven due to the battery SOC and stopping driving the engine when a fuel remaining amount is a second reference value or less.

For example, the method may further include stopping power generation by the motor when the battery is charged as much as the received charge power instruction.

For example, the method may further include stopping the battery power output mode when the battery SOC is a third reference value or less after the battery power output mode is entered.

According to various embodiments of the present invention described above, it is possible to improve a commercial value by increasing the duration of a V2L function using operation of an engine and operation of a motor in a regenerative braking period when the hybrid electric vehicle is provided with the V2L function.

The effects that can be obtained by embodiments of the present invention are not limited to the effects described above and other effects can be clearly understood by those skilled in the art from the following description.

BRIEF DESCRIPTION OF THE DRAWINGS

The above and other objectives, features and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
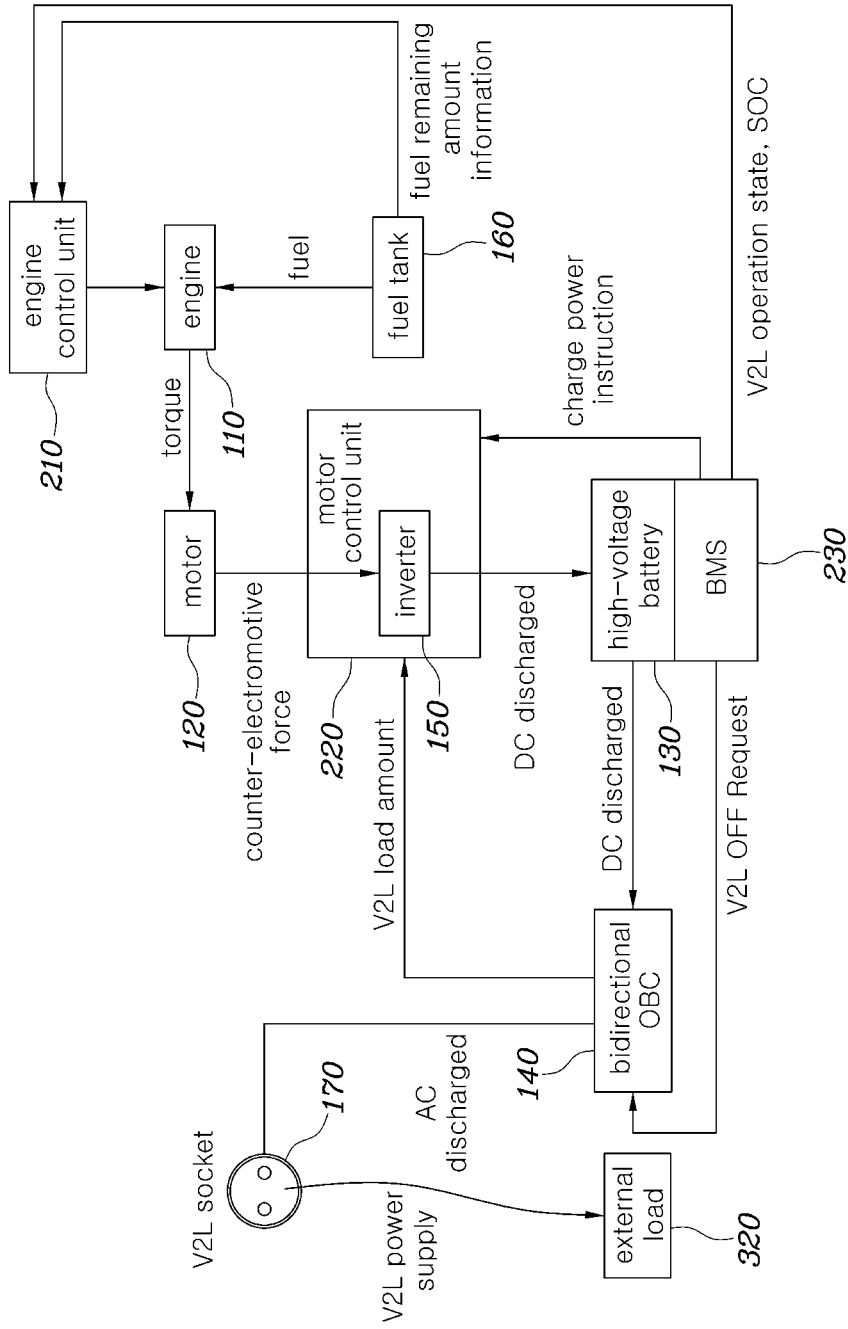
FIG. 1 shows an example of the configuration of a hybrid electric vehicle according to an embodiment of the present invention.

Hereafter, embodiments of the present invention will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to embodiments of the present invention makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present invention.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

A unit or a control unit included in names such as a motor control unit (MCU) and an engine control unit (ECU) is only a term that is generally used to name a controller that controls specific functions of a vehicle rather than meaning a generic function unit. For example, each control unit may include a communication device that communicates with another control unit or a sensor to control corresponding functions, a memory that stores an operating system or logic commands and input/output information, and one or more processors that performs determination, calculation, decision, etc. for controlling the corresponding functions.

Before describing a method of controlling a hybrid electric vehicle according to embodiments of the present invention, the configuration of a hybrid electric vehicle that can be applied to embodiments are described first.

FIG. 1 shows an example of the configuration of a hybrid electric vehicle according to an embodiment of the present invention.

Referring to FIG. 1, the configuration of a hybrid electric vehicle equipped with a hybrid system including an engine no (internal combustion engine (ICE)) and a motor 120.

A bidirectional power conversion device is required to use a V2L function, which converts and outputs power of a battery into DC power to the outside, in a hybrid electric vehicle having the configuration shown in FIG. 1. The bidirectional power conversion device may include a bidirectional on-board charger (OBC) 140. A common OBC is a device that converts AC voltage input to a vehicle into DC voltage when an electric vehicle is slowly charged or is charged through a portable charger connected to a home socket. However, the bidirectional OBC 140 performs the function of a common OBC when charging a battery and can output AC voltage by converting DC voltage of a high-voltage battery 130 into AC voltage when a V2L function is used. Accordingly, it is possible to use an external load 320 through connection with a V2L socket 170 to which AC voltage is supplied.

Meanwhile, in a hybrid electric vehicle to which embodiments of the present invention can be applied, the high-voltage battery 130 can be controlled by a battery control unit 230, the internal combustion engine no can be controlled by an engine control unit 210, and the motor 120 can be controlled by a motor control unit 220.

The battery control unit 230 is also referred to as a battery management system (BMS). The battery control unit 230 can determine the state of charge (SOC) of the high-voltage battery 130 and the operation state of a battery power output mode. The battery power output mode is a mode in which power is supplied to devices by converting DC voltage of an input terminal, which is connected to the battery control unit 230, into AC voltage and outputting the AC voltage, and is the same as the V2L mode described above. The battery control unit 230 can transmit battery power output mode operation state information and battery SOC information to the engine control unit 210 and a charge power instruction output from the battery control unit 230 can be transmitted to the motor control unit 220, which will be described below.

The engine control unit 210 is also referred to as an engine management system (EMS). The motor control unit 220 can control a gate drive unit (not shown) using a pulse width modulation (PWM) type of control signal on the basis of a motor angle, a phase voltage, a phase current, requested torque, etc. of the motor 120, and the gate drive unit can control an inverter 150 that drives the motor 120.

Of course, it is apparent to those skilled in the art that the connection relationship of the control units and the functions/discrimination of the control units described above are only examples and are not limited to the names. For example, the battery control unit 230 may be implemented such that a corresponding function is replaced and provided by any one of the other control units, or the corresponding function may be separately provided by two or more of the other control units.

The configuration described with reference to FIG. 1 is only an exemplary configuration of a hybrid electric vehicle and it would be apparent to those skilled in the art that a hybrid electric vehicle to which embodiments of the present invention apply is not limited to the structure described above.

It is proposed in an embodiment of the present invention to perform control such that the motor 120 generates electricity and the high-voltage battery 130 is charged by a charge power instruction through the battery control unit 230, the engine control unit 210, and the motor control unit 220 in a hybrid electric vehicle.

The battery control unit 230 may determine a battery power output mode operation state and a battery SOC and may transmit battery power output mode operation state information and battery SOC information to the engine control unit 210 on the basis of the determined states. The battery control unit 230 may determine the SOC of the battery when determining that the battery power output mode is in operation, and may not determine the SOC of the battery when determining that the battery power output mode is not in operation. Accordingly, the battery control unit 230 may transmit the determined SOC information of the battery to the engine control unit 210 such that the engine control unit 210 determines whether to drive the engine no.

The battery control unit 230 may output a charge power instruction when the SOC of the battery is a first reference value or less. The first reference value may be a preset fixed value or may be variably set by users.

However, when the battery control unit 230 determines that the battery has been sufficiently charged, there is no need for the motor 120 to generate electricity and charge the battery, so the battery control unit 230 may not output a charge power instruction when the battery SOC exceeds the first reference value.

In detail, the method of outputting a charge power instruction by the battery control unit 230 is as follows.

The battery control unit 230 may output a load amount in the battery power output mode or a battery discharge amount in the battery power output mode as the charge power instruction. The charge power instruction may mean the charge amount of the high-voltage battery 130 according to controlling the motor 120 into a power generation period.

The load amount in the battery power output mode may mean a power amount that is supplied to an external load or a power consumption amount by an external load and the battery discharge amount in the battery power output mode may mean the amount of power discharged from the battery after the battery power output mode is operated. It is possible to sufficiently secure the amount of power that is generated by the motor 120 to charge the high-voltage battery 130 by setting the charge power instruction on the basis of the larger one of the load amount in the battery power output mode and the battery discharge amount in the battery power output mode. Accordingly, it is possible to variably control the charge amount of the high-voltage battery 130 in accordance with situations, so it is possible to not only improve power efficiency, but also to increase the duration of the battery power output mode.

When the SOC of the battery exceeds the first reference value due to charging, the motor control unit 220 may stop controlling the motor 120 for charging the battery.

Meanwhile, the engine control unit 210 may drive the engine no when the battery SOC in the battery power output mode is the first reference value or less. On the contrary, when the battery SOC exceeds the first reference value, there is no need for the motor 120 to generate electricity and charge the battery. Accordingly, since it is not the situation in which the motor should generate power using power from the engine, the engine control unit 210 may turn off the engine 110.

The engine control unit 210 may determine a fuel remaining amount state for driving the engine 110 on the basis of fuel remaining amount information received from a fuel tank 160 and may stop the engine no when the engine is being driven due to the battery SOC and the remaining fuel is a second reference value or less. The second reference value may be a value set in advance in the engine control unit 210 or may be a value set by a driver, but is not necessarily limited thereto. By controlling whether to drive the engine on the basis of the second reference value, it is possible to prevent even minimum fuel for driving being consumed to provide a V2L function.

Separately from the engine control unit 210 determining the fuel remaining amount state, a user may stop the battery power output mode after the battery power output mode is entered, or the battery power output mode may be maintained until the battery SOC reaches a third reference value to be described below.

When the SOC of the battery is the third reference value or less after the battery power output mode is entered, the battery control unit 230 may request the bidirectional OBC 140 to stop the battery power output mode. The third reference value may mean a minimum SOC for securing a minimum EV mode mileage or efficiently operating a hybrid powertrain in order to move a vehicle to a specific destination, but is not necessarily limited thereto.

Control of charging the battery using power from the engine may be accompanied, but the SOC of the battery gradually decreases as the battery power output mode is continuously operated, so the SOC of the battery that corresponds to the first reference value may be higher than the SOC of the battery that corresponds to the third reference value.

A method of controlling a hybrid electric vehicle according to an embodiment is described on the basis of the configuration of a hybrid electric vehicle described above with reference to FIG. 2.

Figure 2:
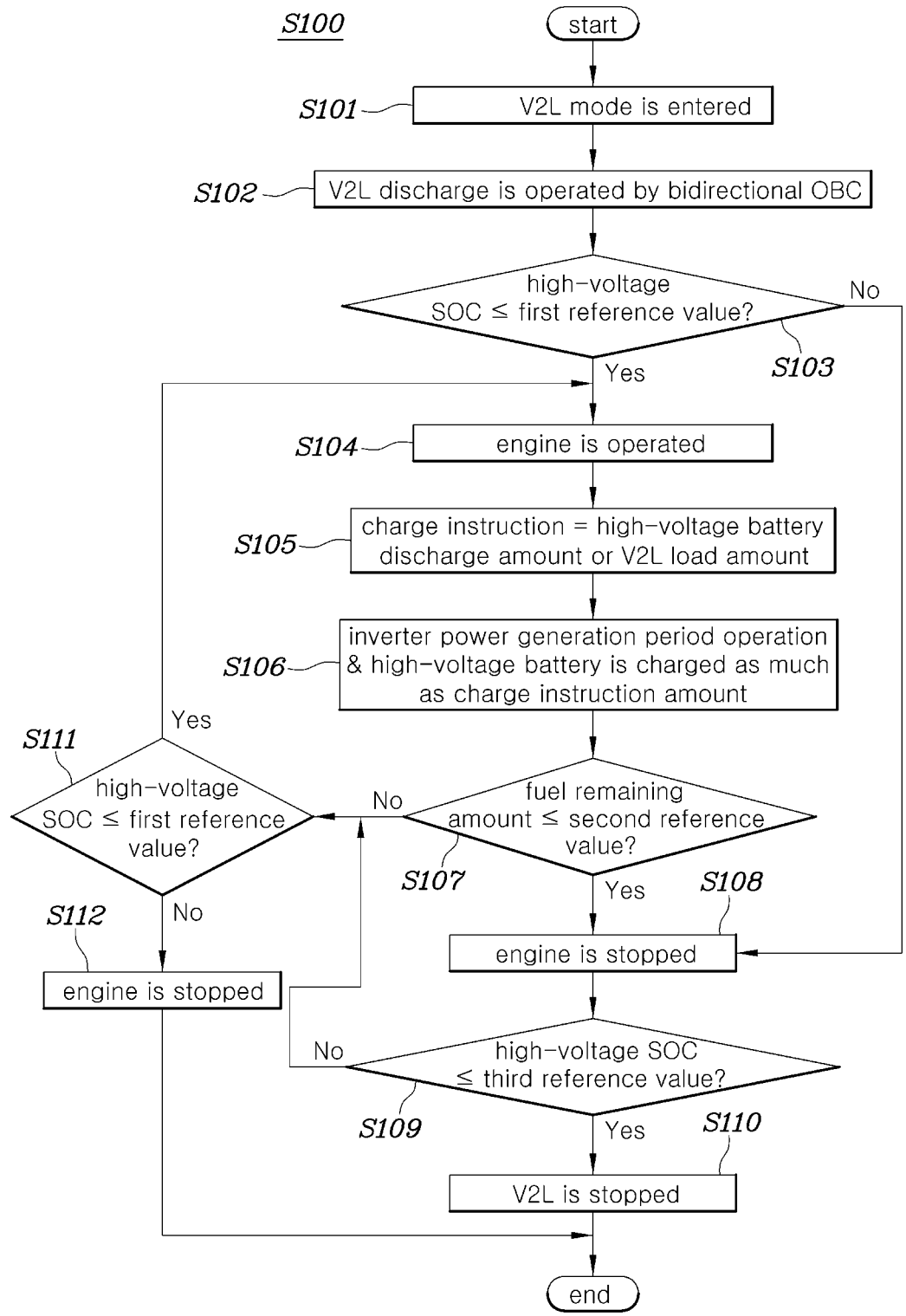
FIG. 2 is a flowchart showing the order of performing a method of controlling a hybrid electric vehicle shown in FIG. 1.

FIG. 2 is a flowchart S100 showing an order of performing a method of controlling a hybrid electric vehicle shown in FIG. 1.

Referring to FIG. 2, first, a battery power output mode may be activated (S101). In the battery power output mode, DC voltage of the battery connected to a terminal of the bidirectional on-board charger (OBC) 140 is converted into AC voltage and the AC voltage is output through another terminal, whereby power is supplied to external devices (S1o2).

Thereafter, the SOC of the battery may be determined (S1o3). When the SOC of the battery is the first reference value or less (YES in S1o3), the engine control unit 210 may drive the engine 110 (S104). When the SOC of the battery is greater than the first reference value (NO in S103), the engine control unit 210 may stop driving the engine 110 (S104). The battery control unit 230 may output a charge power instruction on the basis of a load amount in the battery power output mode or a battery discharge amount in the battery power output mode (S105). The motor control unit 220 may receive the charge power instruction output from the battery control unit 230 and may control the motor 120 on the basis of the received charge power instruction such that the motor 120 generates electricity using power from the engine 110 and the battery is charged (S106).

Thereafter, the engine control unit 210 may determine the fuel remaining amount state for driving the engine 110 (S107). When the engine is driven due to the battery SOC and the fuel remaining amount is the second reference value or less (YES in S107), the engine control unit 210 may stop driving the engine 110 (S108). However, when the fuel remaining amount exceeds the second reference value (NO in S107), whether the battery SOC is the first reference value or less may be determined again (S111). When the SOC of the battery exceeds the first reference value (NO in S111), the engine control unit 210 may stop driving the engine 110 (S112). However, when the SOC of the battery is the first reference value or less (YES in Sin), the engine control unit 210 drives the engine no again (S104).

Thereafter, whether the battery SOC is the third reference value or less may be determined (S109). When the SOC of the battery is the third reference value or less after the battery power output mode is entered (YES in S109), the battery control unit 230 may request the bidirectional OBC 140 to stop the battery power output mode (Silo). However, when the SOC of the battery exceeds the third reference value (NO in S109), whether the battery SOC is the first reference value or less may be determined again (S111). When the SOC of the battery exceeds the first reference value (NO in S111), the engine control unit 210 may stop driving the engine no (S112). However, when the SOC of the battery is the first reference value or less (YES in S111), the engine control unit 210 drives the engine no (S104) again.

As a result, according to embodiments of the present invention, it is possible to improve a commercial value by increasing the duration of a battery power output mode through operation of an engine and power generation of a motor in a hybrid electric vehicle provided with a V2L function that is a function that can convert and output DC power of a battery into common AC power.

Embodiments of the present invention can be achieved as computer-readable codes on a program-recorded medium. A computer-readable medium includes all kinds of recording devices that keep data that can be read by a computer system. For example, the computer-readable medium may be an HDD (hard disk drive), an SSD (solid state disk), an SDD (silicon disk drive), a ROM, a RAM, a CD-ROM, a magnetic tape, a floppy disk, and an optical data storage.

Accordingly, the detailed description should not be construed as being limited in all respects and should be construed as an example. The scope of the present invention should be determined by reasonable analysis of the claims and all changes within an equivalent range of embodiments of the present invention is included in the scope of the present invention.

What is claimed is:

1. A hybrid electric vehicle comprising:
a battery;
a bidirectional power conversion device connected to the battery;
a battery control unit configured to output a charge power instruction when a state of charge (SOC) of the battery is a first reference value or less by determining the SOC of the battery in a battery power output mode in which power of the battery is outputtable to an external load through the bidirectional power conversion device;
an engine control unit configured to drive an engine when the SOC of the battery is the first reference value or less; and
a motor control unit configured to, when the charge power instruction is received, drive a motor such that the motor generates electricity using power from the engine and the battery is charged based on the received charge power instruction,
wherein the battery control unit is further configured to determine the charge power instruction based on a larger one of a load amount in the battery power output mode and a battery discharge amount in the battery power output mode, and
wherein the load amount is a power amount consumable by the external load.

2. The hybrid electric vehicle of claim 1, wherein the battery control unit is configured to transmit battery power output mode operation state information and battery SOC information to the engine control unit and to transmit the charge power instruction to the motor control unit.

3. The hybrid electric vehicle of claim 1, wherein the bidirectional power conversion device comprises a bidirectional on-board charger.

4. The hybrid electric vehicle of claim 3, wherein the battery power output mode is a mode in which power is supplied to external devices by converting DC voltage of the battery connected to a terminal of the bidirectional on-board charger into AC voltage and outputting the AC voltage through another terminal.

5. The hybrid electric vehicle of claim 1, wherein the engine control unit is configured to stop driving the engine when the engine is being driven due to the SOC of the battery and the SOC of the battery exceeds the first reference value.

6. The hybrid electric vehicle of claim 1, wherein the engine control unit is configured to determine a fuel remaining amount state for driving the engine when the engine is being driven due to the SOC of the battery and to stop driving the engine when a fuel remaining amount is a second reference value or less.

7. The hybrid electric vehicle of claim 1, wherein the motor control unit is configured to stop power generation by the motor when the battery is charged as much as the charge power instruction output from the battery control unit.

8. The hybrid electric vehicle of claim 1, wherein the motor control unit is configured to control the motor such that the battery is charged by a counter-electromotive force generated in the motor by power from the engine.

9. The hybrid electric vehicle of claim 1, wherein the battery control unit is configured to stop the battery power output mode when the SOC of the battery is a third reference value or less after the battery power output mode is entered.

10. A method of controlling a hybrid electric vehicle including a battery, a bidirectional power conversion device connected to the battery, and a battery control unit, the method comprising:
   driving an engine and outputting a charge power instruction when a state of charge (SOC) of the battery is a first reference value or less by determining the SOC of the battery in a battery power output mode in which power of the battery is output to an external load through the bidirectional power conversion device;
   determining the charge power instruction based on a larger one of a load amount in the battery power output mode and a battery discharge amount in the battery power output mode; and
   charging the battery by performing power generation through a motor using power from the engine based on the received charge power instruction,
   wherein the load amount is a power amount consumable by the external load.

11. The method of claim 10, further comprising stopping driving the engine when the engine is being driven due to the SOC of the battery and the SOC of the battery exceeds the first reference value as a result of determining the SOC of the battery.

12. The method of claim 10, further comprising:
   determining a fuel remaining amount state for driving the engine when the engine is being driven due to the SOC of the battery; and
   stopping driving the engine when a fuel remaining amount is a second reference value or less.

13. The method of claim 10, further comprising stopping the power generation by the motor when the battery is charged as much as the charge power instruction.

14. The method of claim 10, further comprising stopping the battery power output mode when the SOC of the battery is a third reference value or less after the battery power output mode is entered.

15. The method of claim 10, wherein the bidirectional power conversion device comprises a bidirectional on-board charger.

16. The method of claim 15, wherein the battery power output mode is a mode in which power is supplied to external devices by converting DC voltage of the battery connected to a terminal of the bidirectional on-board charger into AC voltage and outputting the AC voltage through another terminal.

* * * * *